United States Patent [19]

Von Heck

[11] Patent Number: 4,924,358
[45] Date of Patent: May 8, 1990

[54] SAFETY-SPARKLER WAND W/CHEMILUMINESCENT OR ELECTRIC-LIGHT ILLUMINATION

[75] Inventor: Robt. Von Heck, San Diego, Calif.
[73] Assignee: Inventech Licensing Co., San Diego, Calif.
[21] Appl. No.: 242,740
[22] Filed: Sep. 12, 1988
[51] Int. Cl.$^5$ .......................... F21K 2/00; F21V 8/00
[52] U.S. Cl. ........................................ 362/32; 362/34; 362/102; 362/202; 439/219; 439/490
[58] Field of Search ................... 362/32, 34, 102, 806, 362/811, 202, 203, 206; 446/219, 490

[56]  References Cited
U.S. PATENT DOCUMENTS

| | | | |
|---|---|---|---|
| 3,532,874 | 10/1970 | Rosenast | 362/32 |
| 3,624,385 | 11/1971 | Wall | 362/32 |
| 3,644,725 | 2/1972 | Lochridge, Jr. | 362/32 |
| 3,721,815 | 3/1973 | Wall | 362/32 |
| 3,727,043 | 4/1973 | Wall | 362/32 |
| 3,727,044 | 4/1973 | Monroy | 240/10 R |
| 3,900,728 | 8/1975 | Holcombe | 240/52 R |
| 4,055,840 | 10/1977 | Uchytil et al. | 362/32 |
| 4,106,078 | 8/1978 | Inoue | 362/32 |
| 4,106,079 | 8/1978 | Drury | 362/102 |
| 4,186,425 | 1/1980 | Nadimi | 362/32 |
| 4,208,701 | 6/1981 | Schock | 362/202 |
| 4,344,110 | 8/1982 | Ruediger | 362/32 |
| 4,530,036 | 7/1985 | Conti | 362/32 |
| 4,600,974 | 7/1986 | Lew et al. | 446/219 |
| 4,698,183 | 10/1987 | Koroscil | 252/700 |
| 4,715,564 | 12/1987 | Kinn | 244/153 R |

OTHER PUBLICATIONS

Disneyland Fantasy Illustration is an Advertisement from an unknown monthly periodical of 1988; marked exhibit A.

Primary Examiner—Ira S. Lazarus
Assistant Examiner—Richard R. Cole
Attorney, Agent, or Firm—Frank D. Gilliam

[57]  ABSTRACT

A juvenile's fantasy-wand so devised as to convey the visual illusion of a sparkedly burning Jul-4th device or fairy-tale magic-wand appearance, by virtue of employing myraid flexible fiberoptic-strands stemming outward from the upper-end of a rigid baton like holding member; whereby two seperate illuminating options are set forth; 1. a minimal weight version employing a substantially conventional expendable chemiluminescent light-cartridge unit set co-axially into the wand body so as to propagate its light outward via an annular light-receptor serving to pipe the light up and outward through the fountain like cluster of billowing fiber-optic strands; 2. an expendable drycell-battery version preferably employing an ultra-bright LED-lamp set co-axially with a cylinderical light-housing so as to efficiently focus light directly into the upper-end abaxially gathered fiber-optic strands, which likewise blossom outward as a billowing array of tiny sparkling tips; —either version including an optional retractably protective-sheath member of tubular shape allowing the user to deploy the fiber-optic strands at will, plus a co-acting off/on switch arrangement in the electric version; both versions thus providing a fantastic visual night-time splendor of shimmering elements in a hand-portable modality which give-off a realistic illusion of an exciting however comparatively dangerous conventional burning sparkler device.

15 Claims, 1 Drawing Sheet

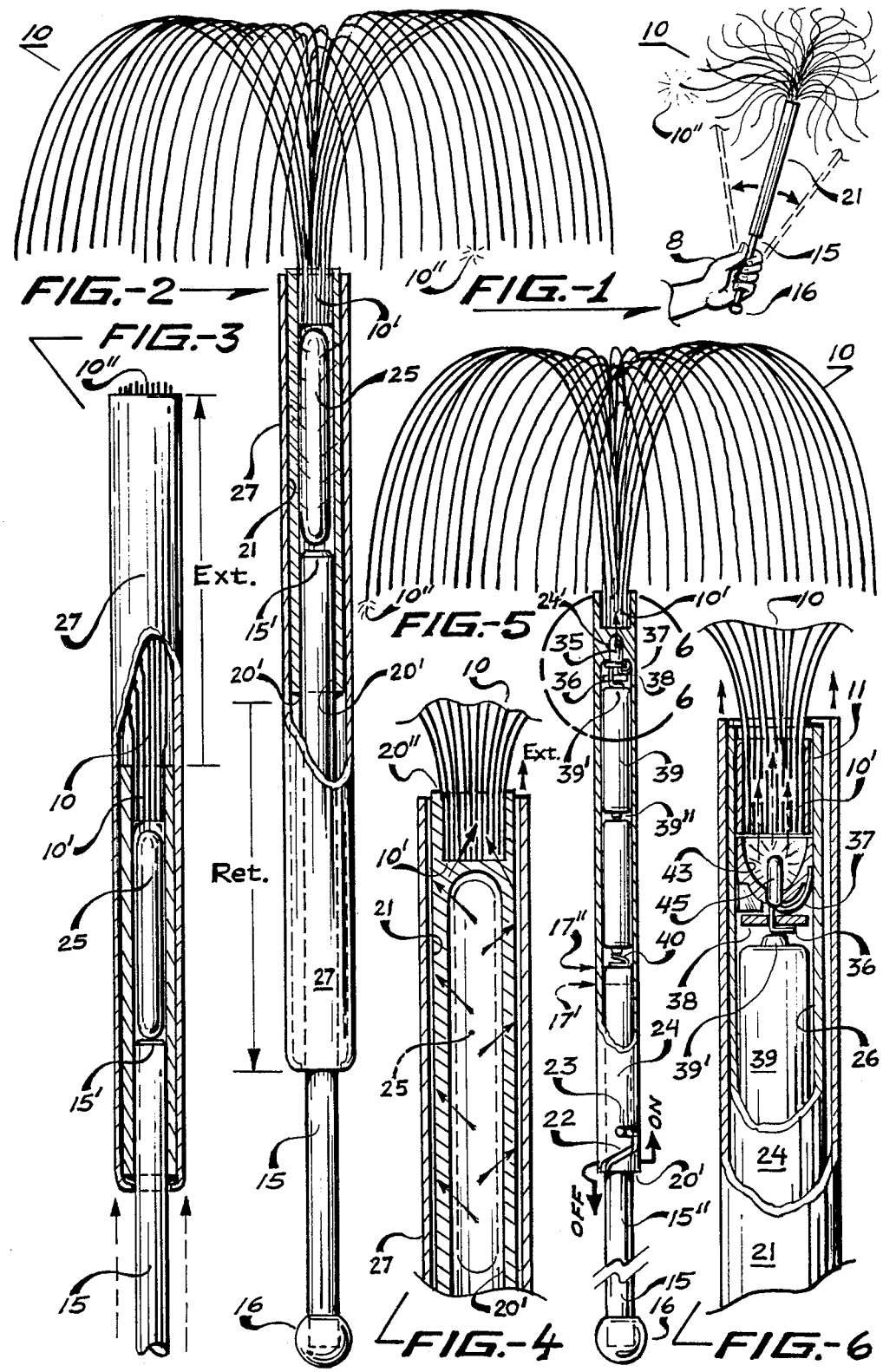

SAFETY-SPARKLER WAND W/CHEMILUMINESCENT OR ELECTRIC-LIGHT ILLUMINATION

BACKGROUND OF THE INVENTION

This invention relates to hand-portable wand devices, and more specifically to novelty wands which are intended to realistically simulate those sparkling, shimmering, magic-wand devices made popular in various childrens fairytales, such as in Walt Disney's cinema fantasy Fantasia (the Sourcer's Apprentice), and 'Peter-Pan', etc..

Additionally, this invention relates to speciait uses of fiberoptics for novelty items such as is conveyed in U.S. Pat. No. 3,727,044 for a decorative Xmas-tree ornament, and in U.S. Pat. No. 4,186,425 for a type of illuminated jewelry apparel. Plus, this invention employs the optional use of either a battery powered lighting means somewhat akin to that employed by the 'StarWars' simulated ray-sword of U.S. Pat. No. 4,208,701, or the luminous-kite toy of U.S. Pat. No. 4,715,564, which employs the use of chemiluminescense 'light-sticks' such as are described in the reactant lighting compositions made popular by the Amer. Cyanamide Corp. such as in U.S. Pat. No. 4,698,183 (specifically a hi-output/short-duration formula) which also lists many of their prior (some now of public domain) chemiluminescent based patents.

However, none of the above, nor other patents reviewed by this inventor, show anticipation of a device which could rather realistically if in fact fascinatingly simulate the appearance of a 'magic-wand' device with which children will particularly enjoy wandering about their neighborhoods holding on Halloween-nite(October -31), and on Independence-nite(July-4) when children often enjoy holding hotly burning 'Sparklers', which although exciting to youth, can be dangerous by inadvertently setting afire their clothing.

Accordingly, the invention as is now to be set forth, is presently being prepared for production by my San Diego, Calif. based 'LightUp Products Co., Ltd*.' under the appropriate tradename of "MagicWand"-a type of safety-sparkler product.

SUMMARY OF THE INVENTION

A. Accordingly, it is an object of this invention to provice a hand-held rod like member with a colinear handle at its base, and a plume of fiberoptic-strands stemming outward from its upper opposing end, including a concentric cavity bore set into the rod body wherein to house a single miniature (1½"-long×⅛"-diam.) or larger (3"-long×⅜"-diam.) chemiluminescent/light-stick, as shall subsequently be referred to herein as a 'light-cartridge' or 'cartridge'; or, to house a flashlight arrangement of components including at least one battery, and lamp unit such as a super/ultra-bright LED(light emitting diode)-lamp or one of the latest hi-efficiency micro-miniature grain-of-wheat type incandescent-lamp devices; in any case, said components to be preferably arranged in a coaxial manner so as to preserve the traditional baton-like shape of a fairy-tale 'wand'.

B. Another object of this invention is to provide a simulated magic-wand according to preceeding summary-A, wherein the handle portion is preferably inserted within the lower end of the rod like main body portion, and being retained thereto either by a simple tight friction-fit male/female relationship, or by a well known screw-on threading arrangement, or by a substantially conventional twist-on bayonet like slot-and-tang mounting arrangement; whereby the handle will also serve to retain the preferred lighting components within the main body portion.

C. Another object of this invention is to provide a simulated magic-wand according to the preceeding summary-A/B, wherein the aggregate handle and main lighting-body portions support an optional sliding tubular sheath member, which serves to protect the rather fragile myriad fiberoptic-strands in its slidably extended position, whereby the strands become linearly clustered therewithin as the sheath is manually shifted upward, but allowed to again blossom out in random fashion as the sliding is manually retracted down the length of the body and handle region.

D. Another object of this invention is to set forth an optional manner of directing light radiating outward from the coaxially arranged light-cartridge cavity or bore, via a light-permeable plastic lighting-body so as to be thus refracted through the annular lighting-pipe arrangement to ultimately become directed in a concentrated manner up into the lower intimately gathered frustrums of the fiberopticstrands*, and thereby finally emanating as divisably concentrated visual light dot display entities as to be seen emerging from the outer-tips of each said strand; this arrangement being particularly suitable for adaptation to linear lighting devices such as a chemiluminescent light-cartridge, although an incandescent lamp could sulfice as well.

E. Another object of this invention is to set forth an optional manner of direction light radiating outward from the bulb region of a coaxially arranged incandescent-lamp preferably of the latest micro-miniature/-grain-of-wheat type having a very tiny hi-intensity filament therein which makes for improved effective light output when employed in conjunction with a miniature parabolic type collimation-reflector and arranged so as to focus the radiant light substantially upward into the intimately gathered frustrums of the fiberoptic-strands, and to finally emanate as divisibly concentrated visual light dot display entities as seen emerging from the outer-tips of each said strand; this method being particularly suitable for adaption to electric light-bulb devices not having a pre-focus directional design.

F. Another object of this invention is to set forth an optional manner of directing light from an electric-lamp of substantially pre-focused (collimated) design such as that of an incandescent-penlight or LED-lamp, which are to be preferably arranged coaxially so that the light beam is directed up into the intimately gathered frustrums of the fiberoptic-strands, and to finally emanate as divisibly concentrated visual light dot display entities as seen emerging from the counter-tips of each said strand. The latest available super/ultra-bright LED-lamp actually being capable of producing 'one full candella' of intense light within a 12-degree broadcase angle, while drawing 2 mA@3-volts, for example.

G. Another object of this invention according to summarys-A/B/D/E is to provide an optional manual off/on-switching means, whereby the battery is arranged colinearly within the lighting-body, and wherein the handle is provided with a convenient twist-to-activate, whereby screw-threads preferably of a quick-acting bayonet-mounting sort enable the handle to exert a selective upward thrusting component upon an x-terminal pole of the battery, the battery thus rising to make y-terminal contact upon the appropriate terminal (critical only for LED-lamp which operate in one electrical current flow direction), while the alternate pole of the lamp already making continuous contact with the preferably annularly metalized-surface (or equivalent conductive member tantamount to conventional flashlight construction) of the lighting-body bore which finally communicates its electrical path down at the lower x-terminal point; thus providing an open-circuit at the y-to-lamp communication point when the non-thrusting 'off'-mode is selected.

BRIEF DESCRIPTION OF THE DRAWINGS

The foregoing and still other objects of this invention will become fully apparent, as well as various advantages and features of novelty residing in the present embodiments, from study of the following description of some currently preferred configurations wherein indica of reference are shown to match related points in the text, as well as in the annexed claims hereto; and accordingly, a better understanding of the invention and the discovered uses is intended, by reference to the drawings, which are considered as pirmarily exemplary and not restrictive in nature.

FIG. 1, is a small pictorial side-elevation view of the invention, demonstrating how it is normally operated by hand when illuminated.

FIG. 2, is a full side-elevation view of the invention, wherein certain members are shown in cutaway manner for greater clarity.

FIG. 3, is a partial side-elevation view of the invention, wherein certain members are shown in cutaway manner for greater clarity.

FIG. 4, is an enlarged partial detail view of FIG. 2, revealing certain elements in still greater clarity.

FIG. 5, is a partial side-elevation view of an alternate embodiment of the invention, wherein a portion is shown in cutaway fashion for greater clarity.

FIG. 6, is an enlarged partial detail view of FIG. 5, showing certain elements in still greater clarity.

DETAILED DESCRIPTION OF THE PREFERRED EMBODIMENTS:

Initial reference is given to FIG. 1 which shows a childs hand 8 holding an unspecified version of the 'magic-wand' invention, whereby the indicated waving of handle 15 easily to-and-fro causes the fiberoptic-strands 10 to billow about vigorously, thereby at night time making the myriad points of emitted light such as is exemplified emerging at out-tip 10" to appear substantially as fleeting sparks, in fact not unlike that of an actually burning celebration 'sparkler', or as if the dazzling display of a magic-wand when a wish is made for example. Yet this 'cool sparkler' may be held by a child in full safety without adult supervision; although it is recommend that this device not be left alone with an infant, since they may attempt to mouth the possibly choking fiberoptic-strands.

Next, in FIG. 2 we see a full view of the invention as it appears with the fiberoptic plumage deployed in a static condition, the partial cutaway revealing how the semi-rigid plastic handle 15 preferably having lower finishing ball-tip 16 is snugly inserted into the lumen of the lower end of the light-body 20 via receiving bore cavity 20' after installation of a standard light-cartridge unit 25 which been naturally previously activated according to conventional light-stick activation procedure. The resulting light radiation (½ to 6-hours duration dependant upon type of chemiluminescent formulation employed) is substantially radially outward therefrom 25 and thus passes into the light-permeably material 20 and upon occluded outer surface 21. This occlusion is preferably increased by a suitable surface coating such as via vacuum-metalizing so as to effectively reflect the radiant light back within the light-body 20 where it ultimately is thus refracted upward upward and into the tightly gathered frustrums of the myriad fiberoptic-strands 10', wherein the light finally exits visibly via their individually distended tips 10". To increase the light-transmission efficiency of the gatheredly appositioned ends 10', the manufacturer may prefer to first dip them enmasse into a clear catalyzed-resin (such as polyester) just prior to pressing the fiberoptic aggregation into the upper receiving bore 20" of the light-body member, thereby improving the light transmissive efficiency of the juncture point significantly.

Also shown in FIG'S. 2 & 3 is the special although optionally built-in sliding-sheath 27 which is seen fully retracted (Ret.) in FIG. 3, and fully extended (Ext.) in FIG. 2, and thereby acting to protect the relatively fragile strands 10, whereby the assembly may thus be conveniently carried in one's pocket for example, without damage. Another advantage of being able to thus selectively deploy or withdraw the perhaps 6-inch long strands 10 is one rather tantamount to an off/on switch for the light-cartridge version in particular, although the protective sheath will perform nicely on the electrical version as well.

Reference to FIG. 5 shows an alternate however equally viable magic-wand embodiment capable of being easily adapted by design variation to any type of known incandescent-lamp illumination means, as well as via LED-lamp indicated 35 which is self-focusing in an upward manner into the gathered ends 10' of the fiberoptic-strands, and includes a constricted portion 24' of the light-body 24 which is shown here to be of opaque plastic material if desired, since the constricted bore 24' portion serves to align the LED-lamp (or other self-focusing lamp) in a collimating manner upwardly only, since this configuration has negated any annular light pick-up arrangement previously described in FIG. 4. Accordingly, FIG. 6 shows the preferred manner by which light radiating from a non-focused micro-miniature grain-of-wheat incandescent-lamp 45 is efficiently directed by a tiny coaxial parabolic-reflector 43 into a collimated-beam up into the frustrums 10' of the fiberoptic-strands 10, which may be pre-gathered for more easier handling by inclusion of a collet 11 preferably made of heat-shrink plastic tubing.

Both FIGS. 5 & 6 employ similar electrical circuiting arrangements, whereby lamp terminal 36 preferably mates unto the base of standard type AAA-battery 39, while lamp terminal 37 is preferably bent sideward so as to communicate firmly unto the preferably electrically conductive bore wall surface 25 (or equivalent conductive means). Notice also that a dielectric separator disk 38 may be included for either type of lamp installation, although certainly the injection-molded plastic reflector 43 could easily include specially formed lower portions which would not only serve to receive the glass lamp-bulb body therein in a coaxial manner, but simple slot entities for terminals 37 and 38 would serve to well stabilize the entire lamp aggregation of FIG. 6. The other circuitry features are substantially standard flashlight construction, including the special screw-thread lower end switching means, whereby here a bayonet type tang 23 and groove 22 arrangement acts to both positively engage the upper handle end 15" (having said tang 23) and provide a quick acting off/on-switch means, since full engagement of the tang 23 shifts the upper handle end from 'off'-position 17' to 'on'-position 17". Thus, while the lower compliance contact terminal 450 is formed so as to both make constant with the inside electrically conductive surface 26 and the protruding post-terminal 39 (positive) of the lower battery in a springable manner owing to the small fold-back portion thereto. Furthermore, in the light-cartridge embodiment exemplified in FIG. 2 and the battery powered embodiment exemplified in FIG. 5, it should be noted that the light-bodies 20 and 24 respectively are made slightly larger so as to allow a loose-fit of the members 25 and 39 therein, while the handle remains a snug friction-fit at least. Thus, the magic-wand may be reused many times in so long as the expendable batteries or cartridge units are replenished.

Accordingly, it is understood that the utility of the foregoing adaptations of this invention is not dependent upon any prevailing invention patent necessarily, and while the present invention has been well described hereinbefore by way of several exemplified preferred embodiments, it should be realized that various changes, rearrangements, or obvious modifications are still possible by those skilled in the art to which it relates, without substantially departing from the implied spirit and scope of the invention.

What is claimed is:

1. A child's hand-portable novelty magic-wand toy article effectively serving as a nighttime safety-sparkler; comprising:
    a chemiluminescently illuminated apparatus, having a detachable lower body rod like carrying handle member of semi-rigid material, including an upper body portion having easy rod securing means for secure insertion of an end of the rod into a bore into a lower lumen portion of an upwardly extending substantially tubular aggregate light-body portion, said light-body made of light-permeable plastic so as to receive light radiating outward from a conventional expendable light-stick cartridge unit manually inserted into the lumen bore, the light thus being piped up via refraction means into base fustrums of myriad fiberoptic-strands fixedly arranged to an uppermost end of the light body; said strands blossoming out distally thereabove so as to freely billow about, thus conveying dynamic points of light appearing much as sparks to an onlooker.

2. A magic-wand toy article according to claim 1, wherein the said rod securing means is attained via a snug friction-fit of the upper rod end into the lower lumen portion of the light-body, whereby the presence of the rod and prevents loss of the light-stick unit from its conversely loose-fit into the same lumen.

3. A magic-wand toy article according to claim 1, wherein the said rod securing means is attained via provision of a substantially conventional screw-thread connection arrangement, whereby the presence of the rod end prevents loss of the light-stick unit from its conversely loose-fit into the lumen bore receptacle.

4. A magic-wand toy article according to claim 1, wherein the said light refraction means includes an annular reflective sleeve or equivalent outersurface metalized-coating so as to increase internal light refraction efficiency of the light-piping effect.

5. A magic-wand toy article according to claim 1, wherein the base frustrums of the fiberoptic-strands are permanently set into the upper most end of the light-body and parallel with the reference axis thereof, preferably including use of a light-permeable plastic resin bond.

6. A magic-wand toy article according to claim 1, wherein the base fustrums of the fiberoptic-strands are intimately gathered as a unit via a provisional collet member such as plastic heatshrink-tubing, prior t permanent installation into the upper most end bore of the light-body in a manner parallel with the reference axis thereof.

7. A magic-wand toy article according to claim 1, wherein the aggregate light-body and upper fiberoptic plumage are provided with a sliding-sheath member of annular formation, whereby manually shifting the sheath from principally about the light-body to an upwardly extended position thus acts to draw the free strands captively within the protective sheathing for instant stowing capability, while retracting the sheath to its original position instantly frees the strands to blossom again.

8. 'A child's hand-portable novelty magic-wand toy article effectively serving as a nighttime safety-sparkler; comprising:
    an electrically illuminated apparatus, having a detachable lower body rod like carrying handle member of semi-rigid material, including an upper end portion having easy connective means for secure insertion into an axial bore of a lower lumen portion of an upwardly extending substantially tubular aggregate light-body member, said light-body being tantamount to a colinear receptacle having said axial bore like cavity just below an axially arranged electric-lamp device and containing a standard coaxially arranged battery, including means by which to efficiently direct light into base frustrums of myriad fiberoptic-strands fixedly arranged to an uppermost end of the light body; said strands blossoming out distally and freely billowing about, thus conveying dynamic points of light appearing much as sparks to an onlooker.

9. A magic-wand toy article according to claim 8, wherein said rod connective means is attained by a a snug friction-fit of the upper rod end into the lower lumen portion of the light-body, and whereby the presense of the rod therein prevents loss of the standard coaxially installed battery from its conversely loose-fit into the lumen bore receptacle.

10. A magic wand toy article according to claim 8, wherein said rod connective means is attained via provision of a screw-thread arrangement cooperative between the upper rod end and the lower lumen portion of the light-body, said arrangement also achieving an expedient off/on electrical switching provision via substantially conventional flashlight circuitry connection construction between a terminal of the coaxial battery and a terminal of the coaxial lamp, whereby counter-clockwise rotation of the handle relative to the light-body provides an open-circuit condition and vice-versa.

11. A magic-wand toy article according to claim 8, wherein said receptacle means includes an axial cavity of suitably reduced depth and diameter set extremely within the lumen bore as receives the axially positioned battery, said cavity serving to accept a pre-focused LED or incandescent type lamp therein, and including an alternate lamp terminal portion which is in electrical communication with an adjoining discretely arranged conductor extending down the bore of the light-body so as to complete a provisional circuit to a lower terminal of the battery when the handle is manually brought upward.

12. A magic-wand toy according to claim 8, wherein said light body includes a coaxially arranged parabolic reflector with suitable incandescent-lamp, the reflector efficiently collimating otherwise defused light in a substantially upward colinear manner upon the frustrums of the fiberoptic-strands.

13. A magic-wand toy article according to claim 8, wherein the base frustrums of the fiberoptic-strands are permanently set into the upper most end of the light-body and parallel with the axial bore thereof, preferably including use of a light-permeable plastic resin bond.

14. A magic-wand toy article according to claim 8, wherein the base frustrums of the fiberoptic-strands are intimately gathered as a unit via a provisional collet member such as plastic heatshrink-tubing, prior to permanent installation into the upper most end bore of the light-body in a manner parallel with the axial bore thereof.

15. A magic-wand toy article according to claim 8, wherein the aggregate light-body and upper fiberoptic plumage are provided with a sliding-sheath member of annular formation, whereby manually shifting the sheath from principally about the light-body to an upwardly extended position thus acts to draw the free strands captively within the sheath for instant stowing capability, while retracting the sheath to its original position instantly frees the strands to blossom again.

* * * * *